United States Patent
Sogabe

(10) Patent No.: US 9,950,579 B2
(45) Date of Patent: Apr. 24, 2018

(54) FACILITY-USE MANAGEMENT SYSTEM, IN-VEHICLE CONTROL APPARATUS, AND IN-FACILITY APPARATUS

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/917,196

(22) PCT Filed: Aug. 21, 2014

(86) PCT No.: PCT/JP2014/004293
§ 371 (c)(1),
(2) Date: Mar. 7, 2016

(87) PCT Pub. No.: WO2015/037193
PCT Pub. Date: Mar. 19, 2015

(65) Prior Publication Data
US 2016/0214445 A1    Jul. 28, 2016

(30) Foreign Application Priority Data
Sep. 10, 2013 (JP) ................................ 2013-187551

(51) Int. Cl.
*B60C 23/02* (2006.01)
*B60C 23/04* (2006.01)
(Continued)

(52) U.S. Cl.
CPC .......... *B60C 23/0479* (2013.01); *B60C 23/04* (2013.01); *B60C 23/044* (2013.01);
(Continued)

(58) Field of Classification Search
None
See application file for complete search history.

(56) References Cited

U.S. PATENT DOCUMENTS 6,622,553 B2* 9/2003 Hayashi .............. B60C 23/0408
73/146
7,760,089 B2* 7/2010 Wu ......................... G01S 7/352
340/541

FOREIGN PATENT DOCUMENTS

JP    2005022602 A    1/2005
JP    2005083025 A    3/2005
(Continued)

OTHER PUBLICATIONS

International Search Report and Written Opinion (in Japanese with English Translation) for PCT/JP2014/004293, dated Oct. 7. 2014; ISA/JP.

(Continued)

*Primary Examiner* — K. Wong
(74) *Attorney, Agent, or Firm* — Harness, Dickey & Pierce, P.L.C.

(57) ABSTRACT

A management computer transmits to a vehicle a request of vehicle ID to identify the vehicle, when a tire ID of the vehicle is not registered in a registration portion. Upon receiving the request, a transmission pattern adjustment section of an ECU of tire pressure monitoring system of the vehicle controls a sensor unit of at least one tire to transmit electric waves in transmission pattern expressing the vehicle ID. The management computer permits the vehicle to use a facility when a vehicle ID specified from the received transmission pattern on electric waves is registered in a registration portion.

8 Claims, 7 Drawing Sheets

(51) Int. Cl.
    *G06Q 50/10*      (2012.01)
    *G07C 9/00*       (2006.01)
    *E04H 6/42*       (2006.01)
(52) U.S. Cl.
    CPC ...... *B60C 23/0442* (2013.01); *B60C 23/0471* (2013.01); *B60C 23/0474* (2013.01); *G06Q 50/10* (2013.01); *G07C 9/00103* (2013.01); *E04H 6/42* (2013.01)

(56) References Cited

FOREIGN PATENT DOCUMENTS

| | | | |
|---|---|---|---|
| JP | 2006256467 | A | 9/2006 |
| JP | 2009054108 | A | 3/2009 |
| JP | 2009238089 | A | 10/2009 |

OTHER PUBLICATIONS

U.S. Appl. No. 14/917,202, filed Mar. 7, 2016, Sogabe.

* cited by examiner

FACILITY-USE MANAGEMENT SYSTEM, IN-VEHICLE CONTROL APPARATUS, AND IN-FACILITY APPARATUS

CROSS REFERENCE TO RELATED APPLICATIONS

This application is a U.S. National Phase Application under 35 U.S.C. 371 of International Application No. PCT/JP2014/004293 filed on Aug. 21, 2014 and published in Japanese as WO 2015/037193 A1 on Mar. 19, 2015. This application is based on and claims the benefit of priority from Japanese Patent Application No. 2013-187551 filed on Sep. 10, 2013. The entire disclosures of all of the above applications are incorporated herein by reference.

TECHNICAL FIELD

The present disclosure relates to a facility-use management system that uses a tire pressure monitoring system and permits use of a facility, and an in-vehicle control apparatus and in-facility apparatus included in the facility-use management system.

BACKGROUND ART

A tire pressure monitoring system (TPMS) in a vehicle is known which measures air pressure of tires using sensor units provided in tires and directly sends measurement values to a reception apparatus in the vehicle wirelessly.

Patent literature 1 discloses an in-facility apparatus that receives an ID sent directly by a sensor unit of the TPMS wirelessly and permits the use of the facility such as opening a shutter of a parking lot when the received ID is already registered in a use-permission database.

PRIOR ART LITERATURES

Patent Literature

Patent literature 1: JP 2005-083025 A

SUMMARY OF INVENTION

If a new tire is substituted unexpectedly, e.g., due to fallen snow, the ID (hereinafter, called tire ID) of the sensor unit attached to the tire is not yet registered in the in-facility apparatus in Patent literature 1; any use permission of the facility cannot be provided.

The methods for registering a tire ID in an in-facility apparatus may include submitting a handwritten application to an administrator; executing an electronic application on a website window displayed in a mobile phone; and manipulating a push button provided in an in-facility apparatus. Those registering methods, however, need times and efforts of users such as correcting errors of wrong tire IDs written or typed, or registering tire IDs each time tires are substituted, thereby making users feel troublesome.

An object of the present disclosure is to eliminate time and effort of a user receiving a use permission of a facility in replacing a tire while reducing costs in a facility-use management system that provides a use permission of the facility by using a tire pressure monitoring system.

According to a first example of the present disclosure, a facility-use management system is provided as follows. The facility-use management system includes an in-vehicle control apparatus and an in-facility apparatus. The in-vehicle control apparatus is used to a tire pressure monitoring system of a vehicle and includes a tire ID transmission request section that transmits a tire ID transmission request to a sensor unit provided in at least one tire of the vehicle, the tire ID transmission request requesting a transmission of a first tire ID identifying the tire. The in-facility apparatus includes an in-facility reception section that receives the first tire ID transmitted wirelessly from the sensor unit, a registration portion in which at least one second tire ID corresponding to a permitted vehicle that is provided with a use permission of a facility is registered, and a use permission section that provides a use permission of the facility to the vehicle when the first tire ID received by the in-facility reception portion is included in (or accords with) the second tire ID registered in the registration portion. The in-facility apparatus includes a vehicle ID transmission request section that requires the in-vehicle control apparatus to transmit a first vehicle ID that identifies the vehicle when the first tire ID received by the in-facility reception section is not included in (or does not accord with) the second tire ID registered in the registration portion, wherein in the registration portion, a second vehicle ID identifying the permitted vehicle is registered in addition to the second tire ID. The in-vehicle control apparatus includes a transmission pattern adjustment section that adjusts a transmission pattern on electric waves transmitted from the sensor unit wirelessly to express the first vehicle ID. The transmission pattern adjustment section adjusts the transmission pattern on electric waves transmitted from the sensor unit to express the first vehicle ID when the vehicle ID transmission request is transmitted from the vehicle ID transmission request section. The in-facility apparatus further includes a vehicle ID specification section that specifies the first vehicle ID from the transmission pattern on electric waves transmitted wirelessly from the sensor unit. The use permission section provides the vehicle with a use permission to use the facility when the first vehicle ID specified by the vehicle ID specification section is included in (or accords with) the second vehicle ID registered in the registration portion.

According to the above, when a tire ID is not registered in the registration portion, the in-facility apparatus transmits a vehicle ID transmission request to the in-vehicle control apparatus. In response to the vehicle ID transmission request, a vehicle ID from the sensor unit is received by the in-facility apparatus. When the vehicle ID is registered in the registration portion, a use permission of the facility can be provided. This configuration can provide automatically a use permission of a facility using a vehicle ID even when a tire replacement involves the state where the tire ID is not registered in the in-facility apparatus.

Further, the vehicle ID is expressed by adjusting the transmission pattern on electric waves, which are transmitted wirelessly from the sensor unit, in the transmission pattern adjustment section of the in-vehicle control apparatus. This can be achieved by changing software programs without need of changing the configuration of an existing tire pressure monitoring system significantly. Costs can be thus suppressed in the facility-use management system that provides a use permission of a facility using the tire pressure monitoring system.

In addition, according to a second example of the present disclosure, a facility-use management system is provided as follows. The facility-use management system includes an in-vehicle control apparatus and an in-facility apparatus. The in-vehicle control apparatus is used to a tire pressure monitoring system of a vehicle and includes a tire ID transmission request section that transmits a tire ID transmission request to a sensor unit provided in at least one tire of the vehicle, the tire ID transmission request requesting a transmission of a first tire ID identifying the tire. The in-facility apparatus includes an in-facility reception section that receives the first tire ID transmitted wirelessly from the sensor unit, a registration portion in which at least one second tire ID corresponding to a permitted vehicle that is provided with a use permission of a facility is registered, and a use permission section that provides a use permission of the facility to the vehicle when the first tire ID received by the in-facility reception portion is included in (or accords with) the second tire ID registered in the registration portion. The in-facility apparatus includes a vehicle ID transmission request section that requires the in-vehicle control apparatus to transmit a first vehicle ID that identifies the vehicle when the first tire ID received by the in-facility reception section is not included in (or does not accord with) the second tire ID registered in the registration portion. The in-vehicle control apparatus includes a pre-replacement tire ID storage portion that stores a pre-replacement tire ID that is a tire ID of a tire of the vehicle replaced by a tire replacement, the pre-replacement tire ID being stored even after the tire is replaced by the tire replacement, and a transmission pattern adjustment section that adjusts a transmission pattern on electric waves transmitted from the sensor unit wirelessly to express the first vehicle ID. The transmission pattern adjustment section adjusts the transmission pattern on electric waves from the sensor unit to express the pre-replacement tire ID that is stored as the first vehicle ID of the vehicle in the pre-replacement tire ID storage portion, when the first vehicle ID transmission request is transmitted from the vehicle ID transmission request section. The in-facility apparatus includes a vehicle ID specification section that specifies the pre-replacement tire ID as the first vehicle ID expressed by the transmission pattern transmitted from the sensor unit wirelessly. The use permission section provides the vehicle with a use permission to use the facility when the pre-replacement tire ID, as the first vehicle ID, specified by the vehicle ID specification section is included in (or accords with) the second vehicle ID registered in the registration portion.

According to the above, when a tire ID is not registered in the registration portion, the in-facility apparatus transmits a vehicle ID transmission request to the in-vehicle control apparatus. In responding to the vehicle ID transmission request, a pre-replacement tire ID from the sensor unit is received as a vehicle ID by the in-facility apparatus. When the pre-replacement tire ID is registered in the registration portion, a use permission of the facility is provided. Even when a tire replacement leads to the state where a tire ID is not registered in the in-facility apparatus, the use permission of the facility can be automatically acquired using the pre-replacement tire ID as the vehicle ID.

In addition, the pre-replacement tire ID as the vehicle ID is expressed by adjusting the transmission pattern on electric waves, which are transmitted wirelessly from the sensor unit, in the transmission pattern adjustment section of the in-vehicle control apparatus. This can be achieved by changing software programs without need of changing the configuration of an existing tire pressure monitoring system significantly. Costs can be thus suppressed in the facility-use management system that provides a use permission of a facility using the tire pressure monitoring system.

In addition, according to other examples of the present disclosure, an in-vehicle control apparatus and an in-facility apparatus each are provided to be used in the facility-use management system according to either the first or second example of the present disclosure. They can thus eliminate time and effort of users receiving use permission of a facility while reducing costs, even when a tire replacement is made in the facility-use management system providing a use permission of a facility using the tire pressure monitoring system.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

The following will explain embodiments of the present disclosure with reference to drawings.

First Embodiment

Figure 1:
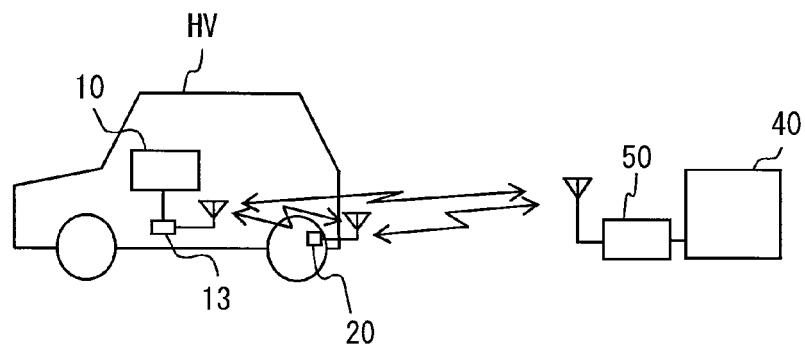
FIG. 1 is a block diagram illustrating an example of a schematic configuration of a facility-use management system according to a first embodiment of the present disclosure.

FIG. 1 is a block diagram illustrating a schematic configuration of a facility-use management system 100 according to a first embodiment of the present disclosure. The facility-use management system 100 in FIG. 1 includes an ECU 10 for TPMS, and a management computer 40.

The ECU 10 for TPMS is mounted in a vehicle HV. The vehicle HV may be also referred to as a host vehicle HV. The ECU 10 for TPMS is also used in a tire pressure monitoring system 30 (hereinafter, TPMS). The ECU 10 for TPMS may be also referred to as an in-vehicle control apparatus. It is noted that the facility-use management system 100 includes a plurality of ECUs 10 for TPMS that are mounted in a plurality of respective vehicles HV. In addition, the following will explain a single vehicle HV (also referred to as a subject vehicle HV) as an example.

Figure 2:
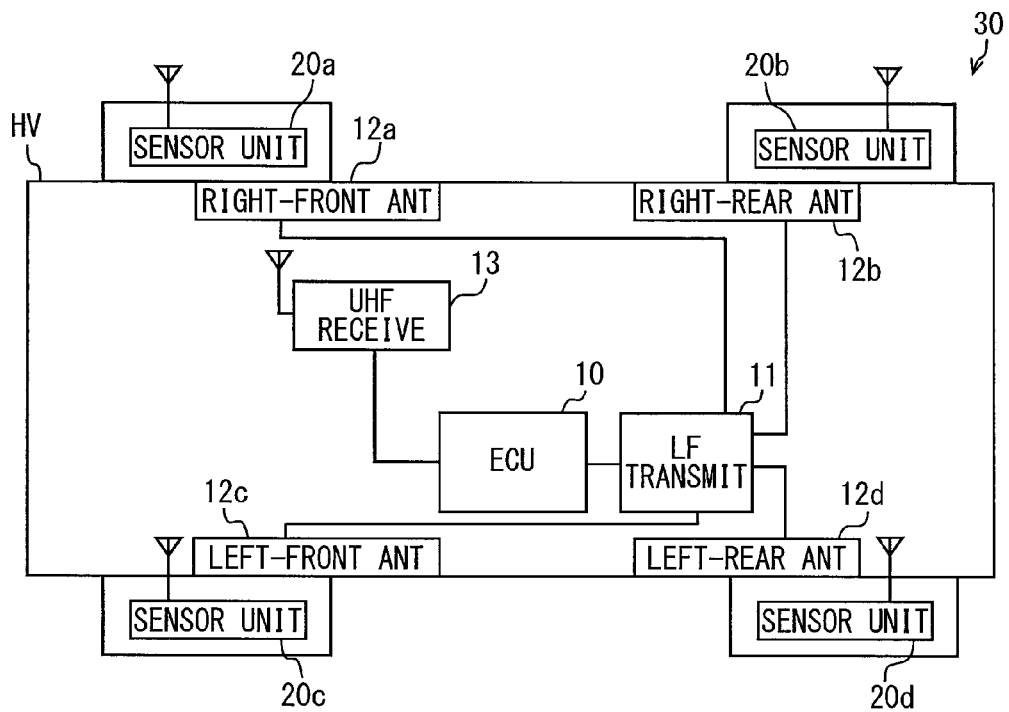
FIG. 2 is a block diagram illustrating an example of a schematic configuration of a TPMS according to the first embodiment of the present disclosure.

The TPMS 30 mounted in the subject vehicle HV will be explained with reference to FIG. 2. As in FIG. 2, the TPMS 30 includes an ECU 10 for TPMS; an LF transmission portion 11; a right-front wheel antenna 12a (hereinafter, right-front wheel ANT); a right-rear wheel antenna 12b (hereinafter, right-rear wheel ANT); a left-front wheel antenna 12c (hereinafter, left-front wheel ANT); a left-rear wheel antenna 12d (hereinafter, left-rear wheel ANT); a UHF reception portion 13 for TPMS; and sensor units 20 (20a-20d).

The ECU 10 for TPMS mainly includes a microcomputer which contains a CPU, ROM, RAM, backup RAM, and I/O (none shown), executing various processes by executing control programs stored in the ROM.

Figure 3:
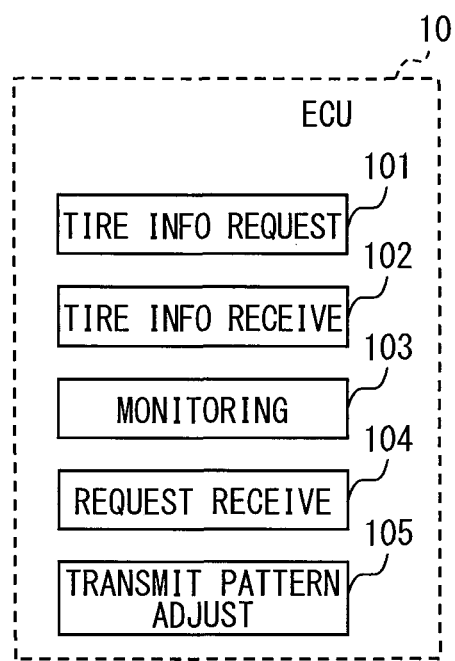
FIG. 3 is a block diagram illustrating an example of a schematic configuration of an ECU for TPMS according to the first embodiment of the present disclosure.

As in FIG. 3, the ECU 10 for TPMS includes functional blocks of a tire information request section 101, a tire information reception section 102, a monitoring processing section 103, a request reception section 104, and a transmission pattern adjustment section 105. The tire information request section 101 transmits a tire information request signal to the LF transmission portion 11 via a communication line.

The LF transmission portion 11 includes an LF antenna, via which the information is transmitted on electric waves of LF band (for example, 30 kHz-300 kHz). The LF antenna includes a right-front wheel ANT 12a in a right-front wheel; a right-rear wheel ANT 12b in a right-rear wheel; a left-front wheel ANT 12c in a left-front wheel; and a left-rear wheel ANT 12d in a left-rear wheel, for instance.

The LF transmission portion 11 transmits a series of tire information request signals, which are sent via the communication line from the tire information request section 101 of the ECU 10 for TPMS, to the right-front wheel ANT 12a, right-rear wheel ANT 12b, left-front wheel ANT 12c, and left-rear wheel ANT 12d, in this order with time intervals. The right-front wheel ANT 12a, right-rear wheel ANT 12b, left-front wheel ANT 12c, and left-rear wheel ANT 12d are, in this order, caused to transmit a series of the tire information request signals to the respective sensor units 20a to 20d on electric waves of LF band.

The UHF reception portion 13 for TPMS includes a UHF antenna, which receives the tire information transmitted one by one in series from the sensor units 20a to 20d on electric waves of UHF band (for example, 300 MHz-3 GHz). The UHF reception portion 13 for TPMS outputs the tire information transmitted from the sensor units 20a to 20d to the ECU 10 for TPMS via the communication line.

The sensor units 20a to 20d, which are collectively referred to as a sensor 20. The sensor unit 20a is provided in the right-front wheel of the vehicle HV; the sensor unit 20b is in the right-rear wheel; the sensor unit 20c is in the left-front wheel; and the sensor unit 20d is in the left-rear wheel. For example, the sensor units 20a to 20d, which are integrated with the respective tire valves, are attached to the respective disc wheels of tires.

For example, each of the sensor units 20a to 20d includes a pneumatic sensor which detects the tire pressure, a wireless communication portion which transmits and receives the information via wireless communication, and a microcomputer which transmits the tire information using the wireless communication portion. The wireless communication portion receives signals transmitted on electric waves of LF band, and transmits signals on electric waves of UHF band, for instance. In addition, the tire information is defined to include a tire pressure detected with a pneumatic sensor, an ID identifying each tire (hereinafter, tire ID), and a tire position. Here, "ID" signifies identification or identification data.

The tire ID may be assigned to each tire, or to each sensor unit 20a to 20d attached to each corresponding tire. The tire position signifies an attachment position of a tire in the vehicle HV, such as right-front wheel, right-rear wheel, left-front wheel, or left-rear wheel.

Each time receiving the respective tire information request signals transmitted one by one on electric waves on LF band via the wireless communication portion from the right-front wheel ANT 12a, right-rear wheel ANT 12b, left-front wheel ANT 12c, and left-rear wheel ANT 12d, the sensor units 20a to 20d detect the tire pressures with the pneumatic sensors and transmit the tire information on electric waves of UHF band.

In the ECU 10 for TPMS, the tire information reception section 102 receives the tire information transmitted one by one from the sensor units 20a to 20d via the UHF reception portion 13 for TPMS. Based on the tire pressures contained in the tire information which the tire information reception section 102 receives, the monitoring processing section 103 performs a monitoring process which monitors the states of the tire pressures of the vehicle HV. The monitoring process, for example, may be provided to display the tire pressures on a display unit (unshown), or to output a notice via a display unit or audio output unit when the tire pressure is not within a normal range.

The following will explain the request reception section 104 and transmission pattern adjustment section 105 of the ECU 10 for TPMS in detail.

Returning to FIG. 1, the ECU 10 for TPMS performs the various processes relevant to the use permission of the facility in addition to the performances as part of the TPMS 30. The various processes relevant to the use permission of the facility will be explained in detail later.

Then, the management computer 40, which is provided to a facility, performs a use permission of the facility. This facility includes a mechanical parking lot, a garage with a electric shutter, and a tollbooth with a gate. The use permission of the facility performed by the management computer 40 includes an opening of a gate or electric shutter in cases of the mechanical parking lot, garage with a electric shutter, and tollbooth with a gate. Here, the management computer 40 may be referred to as an in-facility apparatus.

Figure 4:
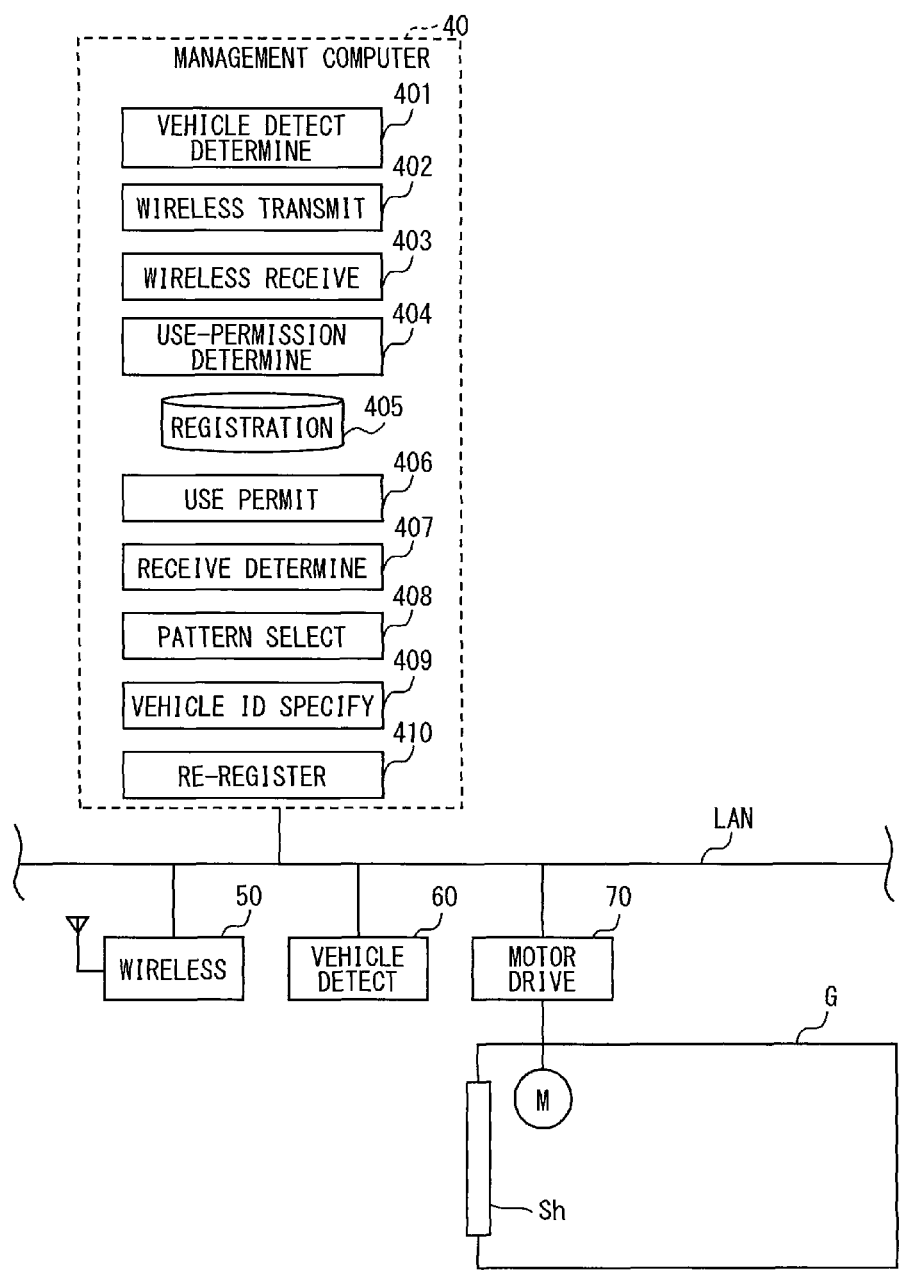
FIG. 4 is a block diagram illustrating an example of a schematic configuration of a management computer according to the first embodiment of the present disclosure.

The management computer 40 will be explained with reference to FIG. 4. In FIG. 4, for instance, the management computer 40 is provided to, as a facility, a garage G with an electric shutter Sh. As in FIG. 4, the management computer 40 is connected with a wireless communication apparatus 50, a vehicle detection sensor 60, and a motor drive control apparatus 70, via, e.g., an LAN to communicate the information.

The wireless communication apparatus 50 transmits wirelessly a tire ID request signal which requests transmission of a tire ID or a vehicle ID request signal which requests transmission of a vehicle ID, according to instructions from the management computer 40. In an example of the present embodiment, the tire ID request signal and the vehicle ID request signal are transmitted on electric waves of UHF band. The ECU 10 for TPMS of the vehicle HV responds to the tire ID request signal or the vehicle ID request signal; thereby, the wireless communication apparatus 50 receives the tire information transmitted one by one from the sensor units 20a to 20d and sends it to the management computer 40.

The vehicle detection sensor 60 can detect that the vehicle HV is located in front of the garage G provided with the management computer 40. The vehicle detection sensor 60 can use the various sensors such as an infrared sensor, weight sensor, ultrasonic sensor, laser radar, or camera.

The motor drive control apparatus 70 performs a drive control of a motor M driving opening and closing of the electric shutter Sh of the garage G. The motor drive control apparatus 70 opens and closes the electric shutter Sh through the drive control of the motor M according to instructions of the management computer 40.

The management computer 40 mainly includes a microcomputer which contains a CPU, ROM, RAM, backup RAM, and I/O (none shown), executing various processes by executing control programs stored in the ROM.

As in FIG. 4, the management computer 40 includes functional blocks respectively corresponding to a vehicle detection determination section 401, a wireless transmission section 402, a wireless reception section 403, a use-permission determination section 404, a registration portion 405, a use permission section 406, a reception determination section 407, a pattern selection section 408, a vehicle ID specification section 409, and a re-registration section 410.

Figure 5:
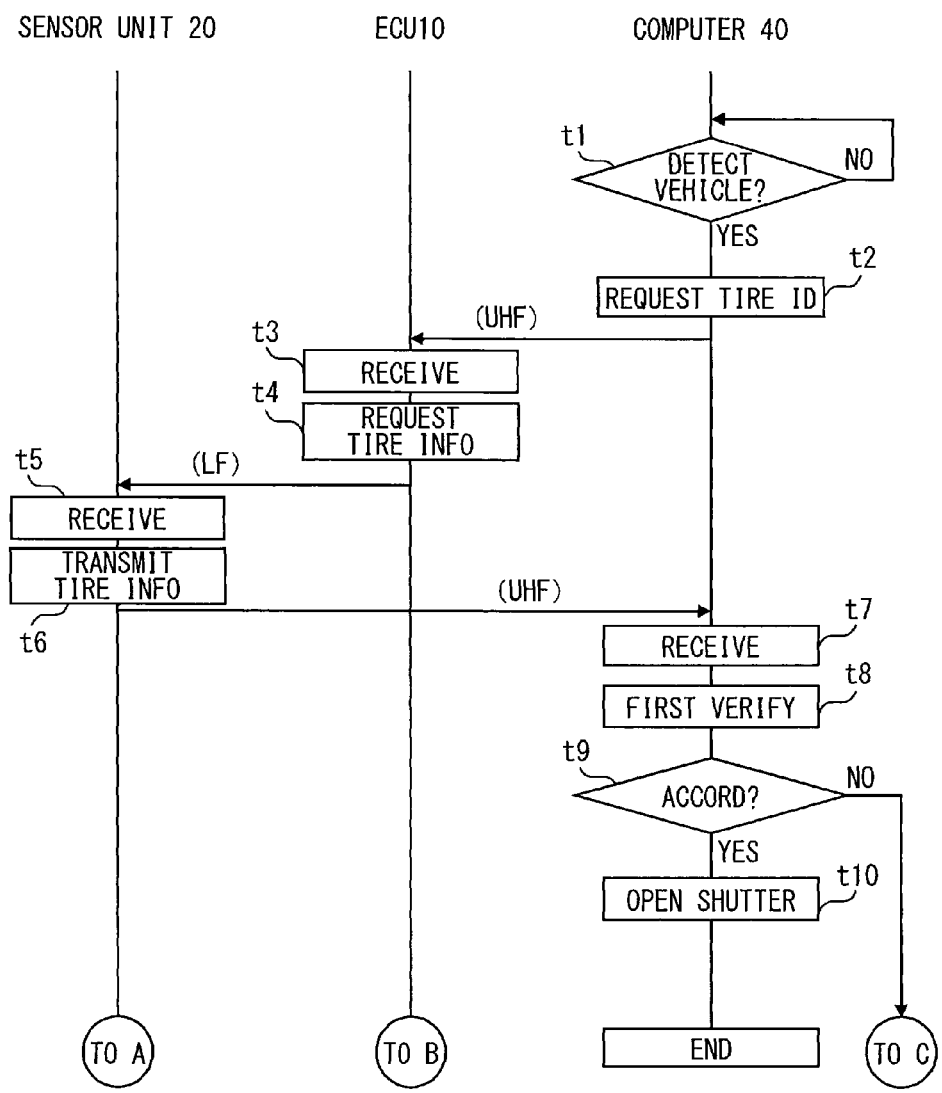
FIG. 5 is a sequence diagram illustrating an example of a flowchart until a use permission of a facility in the facility-use management system according to the first embodiment.
Figure 6:
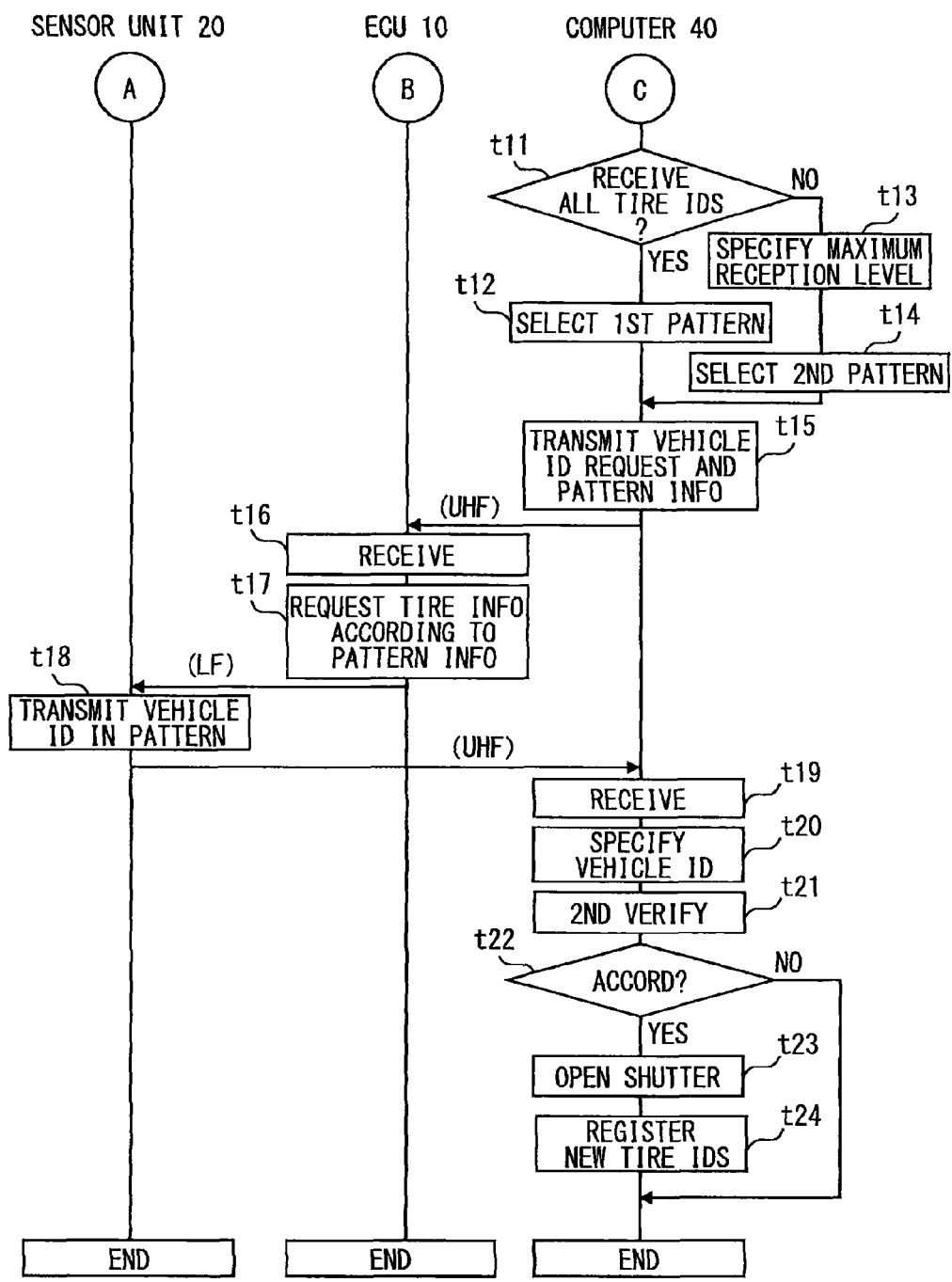
FIG. 6 is a sequence diagram indicating an example of a flowchart until a use permission of a facility in the facility use management system according to the first embodiment.

The following will explain an example of a sequence until a use permission of a facility in the facility-use management system 100 with reference to FIG. 5 and FIG. 6. It is noted that the following explanation is premised on that the vehicle HV and the wireless communication apparatus 50 are located close enough to communicate with each other using electric waves on UHF band.

First, at t1, it is determined whether the vehicle HV is detected by the vehicle detection determination section 401 of the management computer 40. Whether the vehicle HV is detected is determined depending on whether the vehicle HV is detected with the vehicle detection sensor 60. When it is determined that the vehicle HV is detected (t1: YES), the processing moves to t2. In contrast, when it is determined that the vehicle HV is not detected (t1: NO), the determination as to whether the vehicle HV is detected is repeated.

At t2, the wireless transmission section 402 of the management computer 40 transmits a tire ID request signal from the wireless communication apparatus 50. The wireless communication apparatus 50 transmits the tire ID request signal on electric waves of UHF band.

At t3, the request reception section 104 of the ECU 10 for TPMS receives the tire ID request signal on electric waves of UHF band via the UHF reception portion 13 for TPMS. At t4, the tire information request section 101 of the ECU 10 for TPMS transmits the tire information request signal to the LF transmission portion 11; the right-front wheel ANT 12a, right-rear wheel ANT 12b, left-front wheel ANT 12c, and left-rear wheel ANT 12d transmit the respective tire information request signals to the sensor units 20a to 20d on electric waves of LF band. The tire information request section 101 may be also referred to as a tire ID transmission request section.

The above is a case where the tire information request section 101 is caused to transmit the tire information request signals in response to the request from the management computer 40. In such a case, the tire information request signals from the sensor units 20a to 20d are desirably completely transmitted within a transmission time that is shorter than that of the case where the tire information request signals are transmitted autonomously within the vehicle HV. For example, in cases that each of the sensor unit 20a, the sensor unit 20b, the sensor unit 20c, and the sensor unit 20d transmits one piece of corresponding tire information, all the pieces of tire information are desirably completely transmitted within the total transmission time of one second.

The above case of autonomous transmissions of the tire information request signals corresponds to the case where the tire information request section 101 transmits the tire information request signals for the monitoring process monitoring the state of the tire pressures in the TPMS 30. In the autonomous transmissions of the tire information signals, each of the sensor unit 20a, the sensor unit 20b, the sensor unit 20c, and the sensor unit 20d transmits one piece of corresponding tire information, and all the pieces of tire information are completely transmitted within the total transmission time of about one minute.

Further, in the case where the tire information request section 101 transmits the tire information request signal in response to the request from the management computer 40, the tire information request signal may be designed to demand only transmission of a tire ID.

At t5, the wireless communication portion of each sensor unit 20 receives the tire information request signal transmitted on electric waves of LF band. At t6, the wireless communication portion of each sensor unit 20, which receives the tire information request signal, transmits the tire information on electric waves of UHF band. The sensor units 20a to 20d transmit respective tire information one by one in the order from the sensor unit that has received the corresponding tire information request signal.

At t7, the tire information transmitted from the sensor units 20a to 20 on electric waves of UHF band is received by the wireless reception section 403 of the management computer 40 via the wireless communication apparatus 50. The wireless reception section 403 may be referred to as an in-facility reception section. When any tire information is not received, the wireless transmission section 402 of the management computer 40 may instruct the wireless communication apparatus 50 to transmit the tire ID request signals repeatedly within a predetermined number of transmissions or within a predetermined time period.

At t8, the use-permission determination section 404 of the management computer 40 performs a first verification process. The first verification process verifies the tire ID included in the tire information received in the wireless reception section 403 with the registration ID list registered in the registration portion 405. The registration ID list associates (i) the vehicle ID for identifying a vehicle that is given a use permission of the facility, and (ii) the tire IDs of the vehicle. Registration of tire IDs into the registration portion 405 is premised to be made previously, for instance, through a terminal of a dealer at the time of purchasing the vehicle, except for the registration by the re-registration section 410 mentioned later.

At t9, it is determined whether or not the tire IDs associated with the vehicle HV in the registration ID list accord with any one of the tire IDs received from the sensor units 20a to 20d of the vehicle HV based on the result of the first verification process. When the registered tire IDs accord with any one of the received tire IDs (t9: YES), the processing moves to t10. In contrast, when the registered tire IDs do not accord with any one of the received tire IDs (t9: NO), the processing moves to t11.

At t10, the use permission section 406 transmits a shutter open command to the motor drive control apparatus 70 so as to perform a drive control of the motor M to open the electric shutter Sh; the processing then ends. Upon receiving the shutter open command, the motor drive control apparatus 70 performs the drive control of the motor M according to the command and opens the electric shutter Sh of the garage G to enable the garage G to be available.

Moving to FIG. 6, at t11, it is determined whether the reception determination section 407 of the management computer 40 receives the tire IDs (hereinafter, all tire IDs) of all the tires of the vehicle HV. Such determination as to whether to receive all tire IDs may be made depending on whether all tire IDs are received in the wireless reception section 403 at t7. The determination may be made, in addition, depending on whether the reception levels of all tire IDs are equal to or greater than a predetermined value. The reception level may be also referred to as a signal strength.

The predetermined value may be varied as needed. For example, the determination that all tire IDs are received in the wireless reception section 403 may be made depending on whether the respective tire positions in the received tire information correspond to the right-front wheel, right-rear wheel, left-front wheel, and left-rear wheel. The following will explain an example of the present embodiment that is premised that the determination that all tire IDs are received is affirmatively made when (i) all tire IDs are received in the wireless reception section 403 and, simultaneously, (ii) the reception levels of all tire IDs are equal to or greater than a predetermined value.

When it is determined that all tire IDs are received (t11: YES), the processing moves to t12. In contrast, when it is not determined that all tire IDs are received (t11: NO), the processing moves to t13.

At t12, the pattern selection section 408 of the management computer 40 selects a first pattern; the processing then moves to t15. The first pattern signifies a transmission pattern produced using the sensor units 20a to 20d of all the tires, as explained later.

At t13, the reception determination section 407 of the management computer 40 specifies, among all the tire positions, a tire position corresponding to a tire ID providing a maximum reception level; the processing moves to t14. The following will explain an example of the present embodiment that is premised on that the tire position corresponding to the tire ID whose reception level is the maximum is the right-front wheel.

At t14, the pattern selection section 408 of the management computer 40 selects a second pattern; the processing then moves to t15. The second pattern signifies a transmission pattern produced using, among the sensor units 20a to 20d, a sensor unit 20 providing the maximum reception level, as explained later. The example of the present embodiment indicates that the later-mentioned transmission pattern is produced using the sensor unit 20a.

At t15, the wireless transmission section 402 of the management computer 40 transmits (i) a vehicle ID request signal which demands transmission of a vehicle ID, and (ii) the information on the pattern (hereinafter, pattern information) selected in the pattern selection section 408, via the wireless communication apparatus 50. Therefore, the wireless transmission section 402 may also referred to as a vehicle ID transmission request section; the vehicle ID request signal may be also referred to as a vehicle ID transmission request. When the first pattern is selected in the pattern selection section 408, the pattern information of the first pattern is transmitted; when the second pattern is selected, the pattern information of the second pattern is transmitted. The wireless communication apparatus 50 transmits the vehicle ID request signal on electric waves of UHF band.

At t16, the request reception section 104 of the ECU 10 for TPMS receives the vehicle ID request signal and the pattern information, which are transmitted on electric waves of UHF band via the UHF reception portion 13 for TPMS.

At t17, the transmission pattern adjustment section 105 of the ECU 10 for TPMS instructs the information request section 101 to transmit a tire information request signal to cause the corresponding sensor unit 20 to transmit the tire information in a transmission pattern according to the pattern information received in the request reception section 104. The tire information request section 101 thus transmits the tire information request signal via the LF transmission portion 11 to the corresponding ANT 12, which transmits the tire information request signal to the corresponding sensor unit 20 on electric waves of LF band.

Here, the transmission pattern is to express the vehicle ID (i.e., the vehicle mounted with the sensor unit 20) by designating the number of times of transmissions of electric waves from the sensor unit 20 within a fixed time, or by combining an interval of no transmissions of electric waves and an interval of transmissions of electric waves from the sensor unit 20 within a fixed period. The following will explain an example of the present embodiment where "1" is coded with the presence of the transmission of electric waves from the sensor unit 20 while "0" is coded with the absence of the transmission (i.e., no transmission of electric waves), enabling the vehicle ID to be expressed by a series of binary values of "1" and "0".

Figure 7:
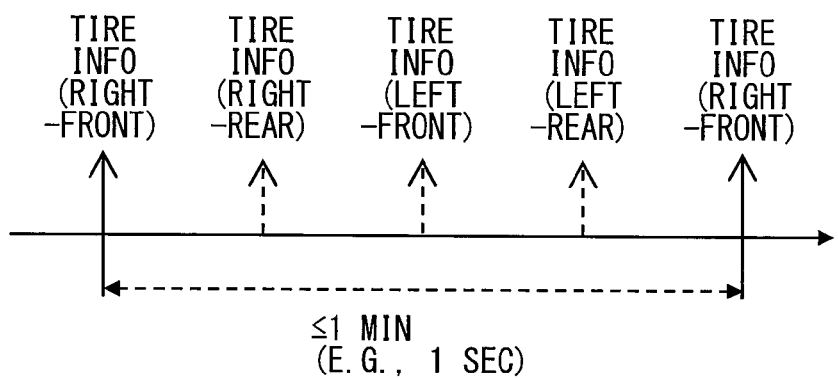
FIG. 7 is a diagram for explaining an example of a first pattern.
Figure 8:
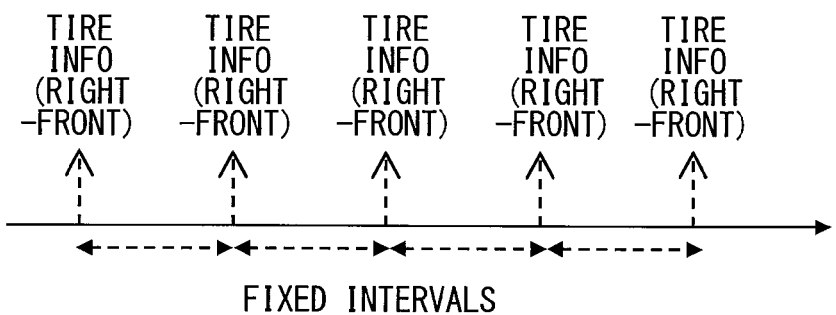
FIG. 8 is a diagram for explaining an example of a second pattern.

For example, the pattern information indicating the first pattern is formed by using the sensor units 20a to 20d of all the tires, as illustrated in FIG. 7. In contrast, the pattern information indicating the second pattern is formed by using only the sensor unit 20a in the right-front wheel, as illustrated in FIG. 8, the sensor unit 20a providing the maximum reception level of the tire ID among the sensor units 20a to 20d. Thus, the second pattern is formed by using the sensor unit 20 in the tire position providing the maximum reception level of the tire ID in the management computer 40, enabling the vehicle ID to be transmitted to the management computer 40 more certainly.

A specific example of the transmission pattern is as follows. The following will explain an example where the vehicle ID is "1101". For instance, the first pattern "1101" is formed such that: the sensor unit 20a in the right-front wheel transmits the electric waves at the first time; the sensor unit 20b in the right-rear wheel transmit the electric waves at the second time; the sensor unit 20c in the left-front wheel does not transmit any electric waves at the third time; and the sensor unit 20d in the left-rear wheel transmits the electric waves at the fourth time.

For instance, the second pattern "1101" is formed such that: the sensor unit 20a performs in series within fixed intervals as follows: the transmission takes place at the first time; the transmission takes place at the second time; no transmission takes place at the third time; and the transmission takes place at the fourth time. Without need to be limited thereto, a plurality of combinations of the presence and the absence of the transmission of electric waves from a sensor unit 20 may be connected repeatedly while the combinations are changed from each other, expressing a larger number of bits.

The following will explain an example of the present embodiment in which the tire information is transmitted wirelessly from the sensor unit 20 by using a transmission pattern of electric waves. The electric waves for expressing a vehicle ID may not be limited to the electric waves carrying the tire information, and may be the electric waves carrying the information other than the tire information or the electric waves carrying none of information.

Returning to FIG. 6, when the pattern information indicates the first pattern, the transmission pattern adjustment section 105 instructs the tire information request section 101 to transmit tire information request signals to cause the sensor units 20a to 20d to transmit the tire information in the transmission pattern that expresses the vehicle ID. In the present embodiment, the transmission pattern adjustment section 105 adjusts the tire information request section 101 to transmit the tire information requests from the LF transmission portion 11, as follows. At the first time, a tire information request is transmitted to the right-front wheel ANT12a; at the second time after the first time by a fixed interval, a tire information request signal is transmitted to the right-rear wheel ANT12b; at the third time after the second time by the fixed time, any tire information request is not transmitted to the left-front wheel ANT12c; and at the fourth time after the third time by the fixed time, a tire information request signal is transmitted to the left-rear wheel ANT12d.

In addition, when the pattern information indicates the second pattern, the transmission pattern adjustment section 105 instructs the tire information request section 101 to transmit tire information request signals to cause only the sensor unit 20a to transmit the tire information in the transmission pattern that expresses the vehicle ID. In the present embodiment, the transmission pattern adjustment section 105 adjusts the tire information request section 101 to transmit the tire information requests from the LF transmission portion 11 to the right-front wheel ANT12a alone, as follows. At the first time, a tire information request is transmitted; at the second time after the first time by a fixed interval, a tire information request signal is transmitted; at the third time after the second time by the fixed time, any tire information request is not transmitted; and at the fourth time after the third time by the fixed time, a tire information request signal is transmitted.

In the present embodiment, at t17, the tire information request section 101 transmits the tire information request signal. There is no need to be limited thereto. For example, at t17, the tire information request section 101 may transmit a signal that requests transmission of a tire ID or a signal that requests transmission of electric waves not carrying any information.

At t18, upon receiving the tire information request signal, the wireless communication portion of the sensor unit 20 transmits the tire information on electric waves of UHF band. The sensor unit 20 receives the tire information request signals from the tire information request section 101 with the adjusted timing (or time intervals); thereby, the sensor unit 20 transmits the tire information expressing the vehicle ID in the transmission pattern according to the above-mentioned pattern information.

At t19, the vehicle ID, which is transmitted from the sensor unit 20 as the transmission pattern on electric waves of UHF band, is received by the wireless reception section 403 of the management computer 40 via the wireless communication apparatus 50. In practice, the tire information transmitted from the sensor unit 20 in a predetermined transmission pattern is received by the wireless reception section 403 of the management computer 40 via the wireless communication apparatus 50.

When any tire information is not received, the wireless transmission section 402 of the management computer 40 may instruct the wireless communication apparatus 50 to transmit the tire information request signals repeatedly within the number of transmissions or within a predetermined time.

At t20, the vehicle ID specification section 409 of the management computer 40 specifies the vehicle ID, which is expressed in the transmission pattern on electric waves carrying the tire information, from the result of the reception of the tire information in the wireless reception section 403. For instance, suppose a plurality of time segments with fixed intervals. When the tire information is received in one time segment, this time segment is coded with "1"; any tire information is not received in one time segment, this time segment is coded with "0". Whether the tire information is received may be determined by whether the reception level is equal to or greater than a predetermined value.

At t21, the use-permission determination section 404 of the management computer 40 performs a second verification process. The second verification process verifies the vehicle ID specified in the vehicle ID specification section 409 with the registration ID list registered in the registration portion 405.

At t22, it is determined whether or not the vehicle ID associated with the vehicle HV in the registration ID list accords with the vehicle ID specified in the vehicle ID specification section 409 based on the result of the second verification process. When the vehicle IDs accord with each other (t22: YES), the processing moves to t23. In contrast, when the vehicle IDs do not agree (t22: NO), the processing ends. At t23, the use permission section 406 transmits a shutter open command to the motor drive control apparatus 70 so as to perform a drive control of the motor M to open the electric shutter Sh; the processing then ends.

At t24, the re-registration section 410 of the management computer 40 registers the tire IDs received in the wireless reception section 403 at t7 as new tire IDs of the vehicle HV in the registration portion 405. The processing then ends. When the re-registration section 410 registers the new tire IDs of the vehicle HV in the registration portion 405, the new tire IDs may be substituted with the old tire IDs of the vehicle HV for the registration.

The present embodiment is provided as follows. When the tire IDs are not registered in the registration portion 405, the management computer 40 transmits a vehicle ID request signal and thereby obtains a vehicle ID from the sensor units 20. When the vehicle ID is already registered in the registration portion 405, the use permission of the facility is provided. Even when any cause such as a sudden tire replacement involves the state where the tire IDs are not under the registered state in the registration portion 405 of the management computer 40, the use permission of the facility can be automatically provided using the vehicle ID transmitted from the sensor units 20.

In addition, the vehicle ID is expressed by the transmission pattern on electric waves carrying the tire information wirelessly from the sensor units 20. This can be achieved by changing software programs without need of changing the configuration of an existing tire pressure monitoring system significantly. Costs can be thus suppressed in the facility-use management system that provides a use permission of a facility using the tire pressure monitoring system. In particular, the TPMS 30 performing the monitoring process that monitors the tire pressure also uses the tire information transmitted from the sensor units 20; thus, the change from an existing tire pressure monitoring system can be suppressed smaller.

Modification

Without need to be limited to the first embodiment, the tire IDs before the tire replacement (hereinafter, pre-replacement tire IDs) may be used as a vehicle ID (hereinafter, a first modification). The configuration of the first modification will be explained with reference to FIG. 9. To simplify the explanation of the present modification, an element or component having the same function as that of the element or component explained in the foregoing embodiment is assigned with the same reference number as that in the foregoing embodiment and omitted from the following explanation. The facility-use management system 100 of the first modification is the same as the facility-use management system 100 of the above-mentioned embodiment, except that the ECU 10 for TPMS is replaced with an ECU 10a for TPMS.

Figure 9:
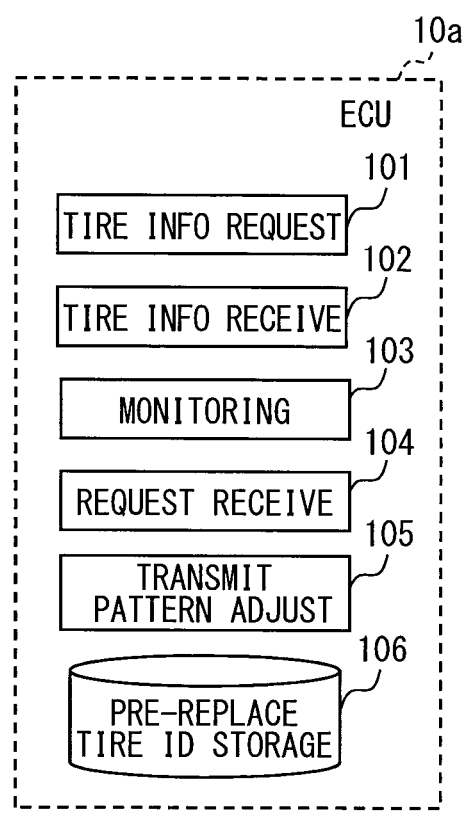
FIG. 9 is a block diagram illustrating an example of a schematic configuration of an ECU for TPMS according to a first modification.

As in FIG. 9, the ECU 10a for TPMS includes functional blocks of the tire information request section 101, the tire information reception section 102, the monitoring processing section 103, the request reception section 104, the transmission pattern adjustment section 105, and a pre-replacement tire ID storage portion 106.

The pre-replacement tire ID storage portion 106 stores the tire IDs of the vehicle HV before the tire replacement. For example, the pre-replacement tire ID storage portion 106 may store the tire IDs, which are received by the tire information reception section 102 via the UHF reception portion 13 for TPMS in the monitoring process.

Even when the tire information reception section 102 receives tire IDs different from tire IDs that have been already stored, the pre-replacement tire ID storage portion 106 continues to store the already-stored tire IDs. That is, even after the tires of the vehicle HV are replaced, the already stored tire IDs (pre-replacement tire IDs) continue to be stored. The pre-replacement tire ID storage portion 106 may also store the tire IDs (i.e., post-replacement tire IDs) different from the pre-replacement tire IDs, and erase the storage of the pre-replacement tire IDs when the post-replacement tire-IDs are newly received by the tire information reception section 102.

In the first modification, the registration ID list registered in the registration portion 405 of the management computer 40 is premised on that the tire IDs are associated with each of the vehicles to which a use permission is provided.

In the first modification, the transmission pattern adjustment section 105 adjusts to permit the electric waves from the sensor units 20 to be transmitted in the transmission pattern expressing the pre-replacement tire IDs stored in the pre-replacement tire ID storage portion 106 as the vehicle ID.

In the first modification, the vehicle ID specification section 409 specifies, as the vehicle ID, the pre-replacement tire IDs, which are expressed in the transmission pattern on electric waves carrying the tire information, from the result of reception of the tire information in the wireless reception section 403.

In the first modification, the use-permission determination section 404 verifies the pre-replacement tire IDs, which is specified as the vehicle ID by the vehicle ID specification section 409, with the registration ID list registered in the registration portion 405. In the first modification, the use-permission determination section 404 determines the use permission of the facility when the tire IDs associated with the vehicle HV in the registration ID list accords with the pre-replacement tire IDs specified by the vehicle ID specification section 409.

When the use permission of the facility is determined by the use-permission determination section 404, the use permission section 406 transmits a shutter open command to the motor drive control apparatus 70 so as to perform a drive control of the motor M to open the electric shutter Sh.

The first modification provides an advantageous effect similar to that of the above-mentioned embodiment. According to the first modification, the management computer 40 can obtain, as the vehicle ID, the pre-replacement tire IDs expressed with the transmission pattern; these pre-replacement tire IDs facilitate the determination of the tire IDs by the re-registration section 410.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A facility-use management system comprising:
an in-vehicle control apparatus used to a tire pressure monitoring system of a vehicle, the in-vehicle control apparatus including a tire ID transmission request section that transmits a tire ID transmission request to a sensor unit provided in at least one tire of the vehicle, the tire ID transmission request requesting a transmission of a first tire ID identifying the tire; and
an in-facility apparatus including
an in-facility reception section that receives the first tire ID transmitted wirelessly from the sensor unit,
a registration portion in which at least one second tire ID corresponding to a permitted vehicle that is provided with a use permission of a facility is registered, and
a use permission section that provides a use permission of the facility to the vehicle when the first tire ID received by the in-facility reception portion is included in the second tire ID registered in the registration portion,
the in-facility apparatus including
a vehicle ID transmission request section that requires the in-vehicle control apparatus to transmit a first vehicle ID that identifies the vehicle when the first tire ID received by the in-facility reception section is not included in the second tire ID registered in the registration portion, wherein in the registration portion, a second vehicle ID identifying the permitted vehicle is registered in addition to the second tire ID,
the in-vehicle control apparatus including
a transmission pattern adjustment section that adjusts a transmission pattern on electric waves transmitted from the sensor unit wirelessly to express the first vehicle ID, the transmission pattern adjustment section adjusting the transmission pattern on electric waves transmitted from the sensor unit to express the first vehicle ID when the vehicle ID transmission request is transmitted from the vehicle ID transmission request section,
the in-facility apparatus further including
a vehicle ID specification section that specifies the first vehicle ID from the transmission pattern on electric waves transmitted wirelessly from the sensor unit,
wherein the use permission section provides the vehicle with a use permission to use the facility when the first vehicle ID specified by the vehicle ID specification section is included in the second vehicle ID registered in the registration portion.

2. A facility-use management system comprising:
an in-vehicle control apparatus used to a tire pressure monitoring system of a vehicle, the in-vehicle control apparatus including a tire ID transmission request section that transmits a tire ID transmission request to a sensor unit provided in at least one tire of the vehicle, the tire ID transmission request requesting a transmission of a first tire ID identifying the tire; and an in-facility apparatus including
an in-facility reception section that receives the first tire ID transmitted wirelessly from the sensor unit,
a registration portion in which at least one second tire ID corresponding to a permitted vehicle that is provided with a use permission of a facility is registered, and
a use permission section that provides a use permission of the facility to the vehicle when the first tire ID received by the in-facility reception portion is included in the second tire ID registered in the registration portion,
the in-facility apparatus including
a vehicle ID transmission request section that requires the in-vehicle control apparatus to transmit a first vehicle ID that identifies the vehicle when the first tire ID received by the in-facility reception section is not included in the second tire ID registered in the registration portion,
the in-vehicle control apparatus including
a pre-replacement tire ID storage portion that stores a pre-replacement tire ID that is a tire ID of a tire of the vehicle replaced by a tire replacement, the pre-replacement tire ID being stored even after the tire is replaced by the tire replacement, and
a transmission pattern adjustment section that adjusts a transmission pattern on electric waves transmitted from the sensor unit wirelessly to express the first vehicle ID,
wherein the transmission pattern adjustment section adjusts the transmission pattern on electric waves from the sensor unit to express the pre-replacement tire ID that is stored as the first vehicle ID of the vehicle in the pre-replacement tire ID storage portion, when the first vehicle ID transmission request is transmitted from the vehicle ID transmission request section,
the in-facility apparatus including
a vehicle ID specification section that specifies the pre-replacement tire ID as the first vehicle ID expressed by the transmission pattern transmitted from the sensor unit wirelessly,
wherein the use permission section provides the vehicle with a use permission to use the facility when the pre-replacement tire ID, as the first vehicle ID, specified by the vehicle ID specification section is included in the second vehicle ID registered in the registration portion.

3. The facility-use management system according to claim 1, wherein:
in the registration portion, the second tire ID of the permitted vehicle and the second vehicle ID are registered to be associated with each other; and
the in-facility apparatus includes a re-registration section that performs a re-registration that replaces the second tire ID associated with the second vehicle ID in the registration portion with the first tire ID that is received by the in-facility reception section when the first vehicle ID specified by the vehicle ID specification section is included in the second vehicle ID registered in the registration section.

4. The facility-use management system according to claim 1, wherein
when the in-facility reception section receives the first tire ID of the sensor unit of each of all tires of the vehicle,
the transmission pattern adjustment section adjusts the transmission pattern to express the first vehicle ID of the vehicle such that the transmission pattern on electric waves is transmitted wirelessly by all sensor units of all the tires of the vehicle.

5. The facility-use management system according to claim 1, wherein
when the in-facility reception section receives the first tire ID from a sensor unit of at least one tire among all tires of the vehicle and simultaneously does not receive the first tire ID from another sensor unit of at least another tire of all the tires, the transmission pattern adjustment section adjusts the transmission pattern to express the first vehicle ID such that the transmission pattern on electric waves is transmitted wirelessly by a sensor unit providing a maximum reception level of the first tire ID among all sensor units of all the tires.

6. The facility-use management system according to claim 1, wherein
the transmission pattern adjustment section adjusts the transmission pattern on electric waves by adjusting transmission timings at which tire ID transmission requests are respectively transmitted from the tire ID transmission request section to sensor units of all tires of the vehicle to cause the first tire ID to be wirelessly transmitted by the sensor units of all the tires.

7. An in-vehicle apparatus used in the facility-use management system according to claim 1.

8. An in-facility apparatus used in the facility-use management system according to claim 1.

* * * * *